US011814229B2

(12) United States Patent
Michaud et al.

(10) Patent No.: US 11,814,229 B2
(45) Date of Patent: Nov. 14, 2023

(54) PACKAGING AND PACKAGING FILM HAVING DIFFERENTIAL BARRIER PROPERTIES

(71) Applicant: AMCOR FLEXIBLES NORTH AMERICA, INC., Neenah, WI (US)

(72) Inventors: Ryan A. Michaud, Winneconne, WI (US); Daniel C. Vennerberg, Neenah, MI (US); John D. Ceranski, Appleton, WI (US); Corey A. Wollaeger, Appleton, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 151 days.

(21) Appl. No.: 16/496,785

(22) PCT Filed: Mar. 31, 2017

(86) PCT No.: PCT/US2017/025518
§ 371 (c)(1),
(2) Date: Sep. 23, 2019

(87) PCT Pub. No.: WO2018/182721
PCT Pub. Date: Oct. 4, 2018

(65) Prior Publication Data
US 2020/0377276 A1    Dec. 3, 2020

(51) Int. Cl.
*B65D 75/36* (2006.01)
*B32B 27/08* (2006.01)
*B65D 65/40* (2006.01)

(52) U.S. Cl.
CPC ............ *B65D 75/367* (2013.01); *B32B 27/08* (2013.01); *B65D 65/40* (2013.01); *B32B 2307/31* (2013.01); *B32B 2307/41* (2013.01); *B32B 2307/412* (2013.01); *B32B 2307/518* (2013.01); *B32B 2307/7244* (2013.01); *B32B 2439/40* (2013.01); *B32B 2439/70* (2013.01)

(58) Field of Classification Search
CPC ............................. B65D 75/367; B65D 65/40
USPC ......... 206/424.6, 524.4, 524.3; 426/118, 120
See application file for complete search history.

(56) References Cited

U.S. PATENT DOCUMENTS

| | | | |
|---|---|---|---|
| 4,769,262 A * | 9/1988 | Ferrar | B65D 81/24 426/106 |
| 5,901,848 A * | 5/1999 | Gorlich | B65D 81/3294 206/439 |
| 6,006,913 A | 12/1999 | Ludemann et al. | |
| RE36,867 E * | 9/2000 | Rozzano | B65D 21/0233 206/459.5 |
| 6,376,032 B1 * | 4/2002 | Clarke | B32B 5/18 264/204 |

(Continued)

FOREIGN PATENT DOCUMENTS

| | | |
|---|---|---|
| EP | 0676920 B1 | 12/1998 |
| EP | 2112090 A1 | 10/2009 |
| WO | 9742897 A1 | 11/1997 |

*Primary Examiner* — Jacob K Ackun (57) ABSTRACT

A transparent film includes a first portion configured to form at least a portion of a first compartment of a multi-component package. The film also includes & second portion, con figured to form at least a portion of a second compartment of the multi-component package. The film further includes a barrier coating disposed on the first portion to reduce permeation of a migratory species through the first portion relative to the second portion.

14 Claims, 4 Drawing Sheets

(56) References Cited

U.S. PATENT DOCUMENTS

| | | | |
|---|---|---|---|
| 7,083,818 B2* | 8/2006 | Pratte | B65D 25/06 |
| | | | 426/115 |
| 7,141,256 B2* | 11/2006 | Noel | B32B 7/06 |
| | | | 426/127 |
| 9,102,125 B2 | 8/2015 | Battersby et al. | |
| 9,132,612 B2* | 9/2015 | Bohrer | B32B 27/10 |
| 9,185,920 B2* | 11/2015 | Clarke | B65D 81/2076 |
| 9,320,288 B2* | 4/2016 | Wood | B41M 3/006 |
| 9,457,953 B1* | 10/2016 | Davies | B65D 33/01 |
| 10,212,931 B2* | 2/2019 | Wood | A01N 25/22 |
| 10,851,259 B2* | 12/2020 | Kravitz | C08K 5/0033 |
| 2007/0179224 A1 | 8/2007 | Fanayar et al. | |
| 2008/0254170 A1* | 10/2008 | Darin | A23B 7/148 |
| | | | 426/118 |
| 2009/0032413 A1 | 2/2009 | Huber et al. | |
| 2009/0289073 A1 | 11/2009 | Moore et al. | |
| 2011/0079531 A1 | 4/2011 | Yildirim et al. | |
| 2011/0127188 A1* | 6/2011 | Thompson | B32B 27/32 |
| | | | 206/438 |
| 2012/0207887 A1* | 8/2012 | Battersby | B32B 15/20 |
| | | | 426/127 |
| 2013/0118116 A1 | 5/2013 | Brannan et al. | |
| 2013/0122138 A1* | 5/2013 | Chappell, Jr. | B65D 81/3294 |
| | | | 426/2 |
| 2015/0376450 A1* | 12/2015 | Beyer | C08J 7/043 |
| | | | 264/129 |

* cited by examiner

PACKAGING AND PACKAGING FILM HAVING DIFFERENTIAL BARRIER PROPERTIES

FIELD

The present application relates generally to packaging films and packages having differential barrier properties.

TECHNICAL BACKGROUND

A number of packaged products include an article in one compartment and another article in another compartment. In some cases is it desirable to alter permeability, such as oxygen permeability, of the packaging in relation to the different compartments. For example, a packaged food product may contain a protein article, such as meat, in a first compartment, and a produce article, such as fruit, in a second compartment. It may be desirable for the packaging to provide a more effective barrier to oxygen transmission to the first compartment in which the meat is stored than to the second component in which the produce is stored, particularly if the meat is more prone to negative effects of oxidization than the produce and the produce requires a low level of respiration.

On addition, consumers or vendors may want to be able to see the articles stored in the first and/or second compartment. For example, the consumer or vendor may want to visually inspect the quality or perceived quality of the stored article. As an example, the consumer may want to determine the quality or quantity of the stored article by visual inspection.

This disclosure, among other things, relates to packaging films and packages ha differential barrier properties. The packages and films may be employed to provide differential oxygen permeability to different compartments of a package. The packages and films may provide differential permeation to moisture, aroma, oxygen or other gasses.

In some aspects disclosed herein, a packaged product includes a first compartment; second compartment separated from the first compartment; a first article in the first compartment; a second article in the second compartment and a film. The film has a first portion and a second portion. The first portion forms at least a portion of the first compartments and the second portion forms at least a portion of the second compartment. The first portion of the film has permeation rate of a migratory species less than the second portion of the film. The first portion of the film comprises a harrier coating to reduce permeation of the migratory species through the first portion of the film relative to the second portion of the film.

In some embodiments the harrier coating is disposed on one or both of an outer surface and an inner surface of the film. Alternatively, the barrier coating may be disposed between two layers of the film.

The barrier coating is not a metallic film layer. The learner coating may comprise a metal compound including metal salts and metal oxides.

One or both the film and the barrier coating may be opaque. In preferred embodiments, the film, the barrier coating, or both are transparent to allow the articles in one or both of the first and second compartments to be seen through the film.

The harrier coating may reduce permeation of any suitable migratory species. For example, the barrier coating may reduce permeation of one or more of oxygen, carbon dioxide, nitrogen, moisture, and aroma molecules. Preferably, the harrier coating reduces permeation of oxygen.

The packaged product may further comprise a container, such as a tray. The container may have a first portion and a second portion. The first portion of the container defines at least a part of the first compartment, and the second portion of the container defines at least a portion of the second compartment. The film sealed to the container such that the first compartment is formed between the first portion of the film and the first portion of the container and w herein the second compartment is formed between the second portion of the film and the second portion of the container. The film may be sealed to the container in any suitable manner. For example, the film may be heat scaled, ultrasonically sealed or adhesively sealed to the container. Preferably, the film is hermetically sealed to the container. The film may be peealable from the container and/or may be resealable to the container.

In some embodiments, the film is scaled to itself to form the package. Such packages may be peelable and/or resealable.

The film may be a multilayer film. In some embodiments, the multilayer film comprises a heat seal layer. In some embodiments, an external surface of the film comprises an oriented layer.

The packaged product may comprise printed indicia. The printed indicia may be included on the film.

The film may include any suitable barrier coating. In some embodiments, the barrier coating comprises one or more of a polyacrylate, a polyalcohol, a polyvinylidene chloride, and an organic-inorganic hybrid.

Any suitable articles may be in the first and second compartments. In some embodiments, one or both of the first article and the second article are food articles.

In some aspects described herein, a film includes a first portion and a second portion. The first portion comprises a barrier coaling to reduce oxygen transmission through the first portion relative to the second portion. The barrier coating may disposed on one or both of an outer surface and an inner surface of the film, or may be disposed between two layers of the film.

The barrier coating is not a metallic film layer. The harrier coating may comprise a metal compound.

One or both of the film and the barrier coating may be opaque. In preferred embodiments, the film, the barrier coating, or both are transparent to allow the articles in one or both of the first and second compartments to be seen through the film.

The barrier coating may reduce permeation of any suitable migratory species. For example, the barrier coating may reduce permeation of one or more of oxygen, carbon dioxide, nitrogen, moisture, and aroma molecules. Preferably, the harrier coating reduces permeation of oxygen.

The film may be a multilayer film. In some embodiments, the multilayer film comprises a heat seal layer. In some embodiments, an external surface of the film comprises an oriented layer.

The packaged product may comprise printed indicia. The printed indicia may be included on the film.

The film may include any suitable harrier coating. In some embodiments, the barrier coating comprises one or more of a polyacrylate, a polyalcohol, a polyvinylidene chloride, and an organic-inorganic hybrid.

In some aspects, a method for forming a film for use in forming a multi-compartment package having a first compartment and a second compartment is described herein. The rate of permeation of a migratory species through the first compartment is less than the rate of permeation of the second compartment. The method includes providing a film; and applying a barrier coating to a first portion of the film configured to form at least a portion of the first compartment. The barrier coating reduces the rate of permeation of the migratory species of the film in the first region relative to a second region of the film configured to form at least a portion of the second compartment.

One or both of the film and the barrier coating may be opaque. In preferred embodiments, the film, the barrier coating, or both are transparent to allow the articles in one or both of the first and second compartments to be seen through the film.

The harrier coating may reduce permeation of any suitable migratory species. For example, the barrier coating may reduce permeation of one or more of oxygen, carbon dioxide, nitrogen, moisture, and aroma molecules. Preferably, the barrier coating reduces permeation of oxygen.

The film may include any suitable barrier coating. In some embodiments, the harrier coating comprises one or more of a polyacrylate, a polyalcohol, a polyvinylidene chloride, and an organic-inorganic hybrid.

In some embodiments, the film comprises a plurality of impressions, each impression comprising a first region configured to form at least a portion of the first compartment and a second region of the film configured to form at least a portion of the second compartment.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

The schematic drawings are not necessarily to scale. Like numbers used in the figures refer to like components. However, it will be understood that the use of a number to refer to a component in a given figure is not intended to limit the component in another figure labeled with the same number. In addition, the use of different numbers to refer to components is not intended to indicate that the different numbered components cannot be the same or similar to other numbered components.

DETAILED DESCRIPTION

Reference will now be made in greater detail to various embodiments of the subject matter of the present disclosure, some embodiments of which are illustrated in the accompanying drawings.

The present disclosure relates to, among other things, packaging films and packages having differential barrier properties. The packages and films may be employed to provide differential permeability to different compartments of a package. Accordingly, articles having differing environmental requirements may be stored in the different compartments of the same package, as appropriate.

Packages described herein include two or more compartments. The packages include a first compartment separated from the second compartment. The first and second compartments are preferably isolated from one another such that an article contained in the first compartment is isolated from an environment of an article contained in the second compartment. Permeability to at least one migratory species through the package to the first compartment is less than permeability of the at least one migratory species through package to the second compartment. At least a portion of the difference in permeability between the first and second compartments is due to differences in permeability through a film that firms at least a portion of the package. In many embodiments, the film has differential permeability to oxygen.

Films described herein include a first portion configured to form at least a portion of the first compartment and include a second portion configured to form at least a portion of the second compartment of the package. The film comprises a harrier coating disposed on a surface of the film that forms the first compartment to reduce oxygen transmission through the portion of the film forming the first compartment relative to the portion of the film forming the second compartment. The barrier coating may be disposed on an inner surface (facing the first compartment) or an outer surface (facing away from the first compartment) of the film or between two layers of the film.

The films may be used to form the entire package or a portion of the package. For example, the film may be sealed to itself to form the separated first and second compartments. Preferably, the film is sealed to another structure that forms a portion of the first and second compartment. The other structure may have permeation properties that are the same or different than the film, in some embodiments, the other structure may have differential permeation properties. The film, when sealed to the other structure, isolates the first compartment from the second compartment. Preferably, contents stored in the different compartments can be viewed through the films.

The films described herein, including portions on which the barrier coating is disposed, may be transparent. As used herein, "transparent" in the context of a film means that the film allows light to pass through the film so that objects behind the film can be distinctly seen. A transparent film may have a light transmittance value of 80% or greater, such as 85% or greater, 90% or greater, or 95% or greater. Light transmittance values may be measured in any suitable manner, such as using ASTM D-1003-13—Standard Test Method for Haze and Luminous Transmittance of Transparent Plastics (2013). A transparent film may have a haze value of 25% or less, such as 10% or less or 5% or less. Haze refers to the amount of light transmitted through a film that is subjected to wide angle scattering, such as an angle that is greater than 2.5 degrees from normal. Haze vale may be measured in any suitable manner, such as using ASTM D-1003-13—Standard Test. Method for Haze and Luminous Transmittance of Transparent Plastics (2013). For example, a transparent film may have a light transmittance of 85% or greater and a haze of 25% or less.

Films

Any suitable film may be employed to produce a package having compartments with differing oxygen permeability. The film may comprise one or more layers. The term layer refers to a discrete component of the film that has a substantially uniform composition. A layer may or may not be coextensive with the film.

A layer may comprise a polymer. As used herein, a "polymer" refers to a material that is the product of polymerization or copolymerization of natural, synthetic or combined natural and synthetic monomers or co-monomers, or monomers and co-monomers, and is inclusive of homopolymers, copolymers, terpolymers, and the like. A layer may comprise a single polymer, a mixture of a polymer and non-polymeric material, a combination of two or more polymers blended together, or a mixture of two or more polymers and non-polymeric material.

The film may comprise any suitable number of layers. For example, the packaging film may comprise one or more of a scaling layer, an abuse-resistant outer layer, an intermediate layer, a tie layer, and the like.

Seal Layers

The films described herein may comprise a seal layer. A "seal layer" refers to a layer or layers of the film involved in the sealing of the film to itself or another article, such as a tray.

Preferably, the film comprises a heat seal layer. The term "heat seal layer" refers to a layer capable of fusion bonding by conventional indirect heating means which generate sufficient heat on at least one film contact surface for conduction to the contiguous film contact surface and formation of a bond interface therebetween without loss of the film integrity. The bond interface between contiguous inner layers preferably has sufficient physical strength to withstand the packaging process and subsequent handling.

In some embodiments, the heat seal layer comprises a polyolefin. "Polyolefin" is used herein broadly to include polymers such as polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight and may vary depending upon the parameters and processes chosen for their manufacture in accordance with the teachings of the polymer arts. Seal layers could include materials and/or layer structures that result in peelable seals.

In some embodiments, the heat seal layer comprises one or more of an ionomer, polyester, heterogeneous ethylene alpha olefin copolymer, a homogeneous ethylene alpha olefin copolymer, ethylene vinyl acetate copolymer, ethylene methyl acrylate copolymer, ethylene propylene copolymer, polybutylene homopolymer or copolymer, and blends thereof.

In some embodiments, the heat seal layer comprises a blend of polymers to obtain suitable or desired properties.

Outer Layer

The films described herein, if the films are multi-layer films, include an outer layer. Since it is seen by the user/consumer, the exterior surface of the outer layer of the film preferably has desirable optical properties such as matte or gloss effects. Also, the exterior surface of the outer layer preferably withstands contact with sharp objects and provides abrasion resistance. The outer layer may or may not also be used as a heat sealable layer and thus may comprise one or more suitable heat seal polymers such as polyethylene or polypropylene. As the exterior surface layer of the film, this layer most often is also the exterior layer of any package of which the film forms at least a portion, and therefore may be subject to handling and abuse e.g. from equipment during packaging, and from rubbing against other packages and shipping containers and storage shelves during transport and storage.

The exterior surface layer should be easy to machine (i.e. be easy to feed through and be manipulated by machines e.g. for conveying, packaging, printing or as part of the film or packaging manufacturing process). Suitable stiffness, flexibility, flex crack resistance, modulus, tensile strength, coefficient of friction, printability, and optical properties are also frequently designed into exterior layers by suitable choice. Of materials. This layer may also be chosen to have characteristics suitable for creating desired heat seals which may be resistance to burn through e.g. by impulse sealers or may be used as a heat sealing surface in certain package embodiments e.g. using overlap seals.

Suitable exterior surface layers may comprise: oriented polyester, amorphous polyester, polyamide, polyolefin, cast or oriented nylon, polypropylene, or copolymers, or blends thereof. Oriented films of this or any other layer may be either uni-axially or bi-axially oriented. The exterior layer thickness is typically 0.5 to 2.0 mils. Thinner layers may be less effective for abuse resistance, however thicker layers, though more expensive, may advantageously be used to produce films having unique highly desirable puncture resistance and/or abuse resistance properties.

Intermediate Layers

A film described herein may include an intermediate layer. An intermediate layer is any layer between two other layers and may include barrier layers, tie layers or layers having functional attributes useful for the film structure or its intended uses. Intermediate layers may be used to improve, impart or otherwise modify a multitude of characteristics: e.g. printability for trap printed structures, machinability, tensile properties, flexibility, thermoformability, stiffness, modulus, designed delamination, easy opening features, tear properties, strength, elongation, optical, moisture barrier, oxygen or other gas barrier, radiation selection or barrier e.g. to ultraviolet wavelengths, etc. Suitable intermediate layers may include: adhesives, adhesive polymers, oriented polyester, amorphous polyester, polyamide, polyolefin, nylon, polypropylene, or copolymers, or blends thereof. Suitable polyolefins may include:

polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification, low density polyethylene (LDPE), high density polyethylene (HDPE), linear low density polyethylene (LLDPE), ethylene methacrylic acid (EMA), ethylene acrylic acid (EAA), modified polyolefins e.g. anhydride grafted ethylene polymers, etc.

Tie Layers

A film as described herein may comprise one or more adhesive layers, also known in the art as "tie layers," which can be selected to promote the adherence of adjacent layers to one another in a multilayer film and prevent undesirable delamination. A multifunctional layer is preferably formulated to aid in the adherence of one layer to another layer without the need of using separate adhesives by virtue of the compatibility of the materials in that layer to the first and second layers. In some embodiments, adhesive layers comprise materials found in both the first and second layers.

Multilayer films can comprise any suitable number of tie or adhesive layers of any suitable composition. Various adhesive layers are formulated and positioned to provide a desired level of adhesive between specific layers of the film according to the composition of the layers contacted by the tie layers. The interior, exterior, intermediate or tie layers may be formed of any suitable thermoplastic materials, for example, polyamides, polystyrenes, styrene copolymers e.g. styrene-butadiene copolymer, polyolefins, and in particular members of the polyethylene family such as LLDPE, very low density polyethylene (VLDEPE), HDPE, LDPE, COC, ethylene vinyl ester copolymer or ethylene alkyl acrylate copolymer, polypropylenes, ethylene-propylene copolymers, ionomers, polybutylenes, alpha-olefin polymers, polyesters, polyurethanes, polyacrylamides, anhydride-modified polymers, acrylate-modified polymers, polylactic acid polymers, or various blends of two or more of these materials.

Optional Additives to Layers

Various additives may be included in the polymers utilized in one or more of the exterior, interior and intermediate or tie layers of the film. Conventional anti-oxidants, anti-block additives, polymeric plasticizers, acid, moisture or gas (such as oxygen) scavengers, slip agents, colorants, dyes, pigments, organoleptic agents may be added to one or more film layers of the film or it may be free from such added ingredients.

Barrier Properties of the Films

Films on which a barrier coating may be applied may have any suitable permeation properties regarding, for example, oxygen, carbon dioxide, moisture, aroma, and the like. Application of a barrier coating as described herein will enhance the barrier properties of the film in a coated region relative to the film without the coating. As discussed above and in more detail below, a first portion of the film that forms at least a portion of a first compartment has enhanced barrier properties relative to a second portion of the film that forms at least a portion of a second compartment. The second portion of the film may be uncoated or comprise less coating than the first coating. For example, a thickness of the coating of the first portion may be greater than the coating of the second portion or may be applied or patterned in a manner to provide differential permeation between the first and second portions of the film. Regardless of whether the second portion of the film comprises a barrier coating, the film without any coaling may have some barrier properties.

For example, an uncoated film intended for use in packaging produce may have a permeation rate that allows for suitable exchange of oxygen and carbon dioxide across the film to maintain freshness of the produce. The uncoated portions of the films may have any suitable oxygen transmission rate. For example, the film may have an oxygen transmission rate of at least 775 $cm^3/m^2/24$ hours (50 $cm^3/100$ $in^2/24$ hours), such as an oxygen transmission rate of at least 3100 $cm^3/m^2/24$ hours (200 $cm^3/100$ $in^2/24$ hours). A barrier coated portion of such packaging may have any suitable reduced permeation. For example, a "high" barrier coated portion of a film may have an oxygen transmission rate in a range from essentially zero, e.g., about $1 \times 10^{-6}$ $cm^3/m^2/24$ hours (approximately $6 \times 10^{-7}$ $cm^3/100$ $in^2/24$ hours), to about 10 $cm^3/m^2/24$ hours (approximately 0.6 $cm^3/100$ $in^2/24$ hours). Typical packages for meats and cheeses have oxygen transmission rates from about $1 \times 10^{-3}$ $cm^3/m^2/24$ hours to about 0.1 $cm^3/m^2/24$ hours. By way of further example, an uncoated film intended for use in packaging sea food may have an oxygen transmission rate of 10.000 $cm^3/m^2/24$ hours (approximately 650 $cm^3/100$ $in^2/24$ hours) or greater.

One of skill in the art of packaging manufacturing will understand that the selection of materials and layers for the multilayer packaging film will affect the oxygen transmission rate of the film and will be readily able to select appropriate materials and layers to achieve a suitable oxygen transmission rate for the intended use of the film.

Examples of polymers that can be used to achieve high oxygen transmission rates include polyethylene, polypropylene such as oriented polypropylene, styrene polymers such as styrene-butadiene copolymers, polymethylpentene cyclic olefin copolymers (COC), and the like. It will be understood that the thickness of the films and layers will affect the oxygen transmission rates, with thinner films and layers tending to allow for greater oxygen transmission.

Film Thickness

A film described herein may have any suitable thickness. In some embodiments, the packaging film has a total thickness of less than about 50 mils, more preferably the Pilin has a total thickness of from about 1.0 to 10 mils (25-250 microns (∥), such as from about 1 to 5 mils, or from about 2 to 3.5 mils. For example, entire multilayer films or any single layer of a multilayer film can have any suitable thicknesses, including 1, 2, 3, 4, 5, 6, 7, 8, 9, 10, or 50 mils, or any increment of (1.1 or 0.01 mil therebetween.

In some embodiments, the pack are as thick as 50 mils (1270 microns) or higher, or as thin as 1 mil (25.4 microns) or less. In various embodiments, the packaging films have a thickness of between about 2-4 mil (51-102 microns).

Methods of Manufacture

The films described herein may be made in any suitable manner, such as by conventional processes. Processes to produce flexible films may include e.g. east or blown film processes, or extruding processes.

Packages may be formed from films in any suitable manner. In some embodiments, the packages are formed by heat sealing a film to itself, to another suitable film, or to another suitable structure. In some embodiments, packages such as pouches are thermo formed. In some embodiments, films are heal scaled across an opening of a container.

Barrier Coatings

The first portion of the film that forms at least a portion of the first compartment of a package described herein may be coated with any suitable barrier coating. The coating may comprise any suitable barrier material or materials. Examples of suitable barrier materials include one or more of polyalcohols, polyacrylates, polysaccharides, polyvinylidene chloride (PVdC) latexes, organic-inorganic composites, inorganic coatings, organic vapor deposited coatings, polyester emulsions, polygycolic acids, epoxies, alkyds, polyacerylonitriles polylactic acids (PLA) polyhydroxyalkaonates (PHA), sulphopolyesters, polyurethanes, polyvinyl acetates, poly(vinyl butyral) poly(vinyl pynrolidone protein, fluoropolymers, anionic carboxylated styrene-butadiene copolymer latex, and the like.

Examples of suitable polyalcohols include polyvinyl alcohol (PVOH) and ethylene vinyl alcohol (EVOH). Examples of suitable PVOH that may be employed in a barrier coating include partially and fully saponified grade PVOH, POVAL™ and Elvanol™ from Kuraray, SELVOL™ from Sekisui, and GOHSENOL® from Nippon Gohsei. Clay filled PVOH may also be included in a barrier coating. Preferably, the clay type is montmorilionite but may also include kaolinite, atapulgite, illite, bentonite, halloysite, kaolin, mica, diatomaceous earth and fuller's earth, calcined aluminum silicate, hydrated aluminum silicate, magnesium aluminum silicate, sodium silicate and magnesium silicate. Examples of commercially available clay tilled PVOH that may be included in a barrier coating include Nanopack NanoSeal™ Bairicade XT™ BXT-50. Nanopack NanoSeal™ Bairicade XT™ NSC-60PL. Sunbar (PVOH and/or EVOH with clay). Other examples of PVOH that may be employed in a barrier coating include ZRP-filled PVOH, modified PVOH, and crosslinked PVOH. Examples of suitable EVOH that may be included in a barrier coating include water-soluble grade EVOH, such as Nichigo G-Polymer™ from Nippon Gohscei (Acetic acid ethenyl ester, polymer with ethene and 1,1'-ethenyl-1,2-ethanediyl) diacetate, hydrolyzed), and modified EVOH, such as Michem®Flex B500 from Michelman, Inc., EXCEVAL™ from Kuraray, and modified EVOH available from DuPont.

Examples of suitable PVdC latexes that may be included in a barrier coating include L817B from Asahi Kasei, Diofan® A063 or Diofan® B206 from Solvay, Saran™ from Dow, Daran® from Owensboro Specialty Polymers, and the like.

Examples of saccharides that may be included in a barrier coating include large molecule polysaccharides and oligo-saccharides, as well as small molecule monosaccharides. Examples of large molecule saccharides that may be included in a barrier coating include starches and celluloses. Examples of suitable celluloses include hemicellulose such as xylar, microfibrillated cellulose, microcrystalline Cellulose and nanocellulose. Examples of suitable nanocellulose include cellulose nanofibers such as BioPlus® Fibrils from American Process. Inc., and nanocrystalline cellulose such as CNC from Melodea, Ultra™ CNC from Blue Goose Biorefineries, Inc., and BioPlus-L® CNC from American Process, Inc. Examples of small molecule saccharides that may be included in a barrier coating include sorbitol, mannitol, dulcitol, xylitol, erythritol, chitosan, and a variety of substitution compounds and derivatives thereof.

Examples of suitable polyacrylates for including in a barrier coaling include poly(acrylic acids) such as ionically or covalently crosslinked polycarboxylates, e.g., Besela™ developed by Kureha, polymethacrylates such as polymethacrylic acid, mixtures of polyacrylic acid and polymethacrylic acid, and partially or fully neutralized forms thereof. Other examples of suitable polyacrylates include acrylic copolymers such as acrylonitrile methy acrylate copolymer grafted with butadiene (AMAB) emulsions, e.g., Barex™; and acrylic emulsions such as InMat® NanoLok™ PT and NanoLok™ WR 20135a (with nanofiller).

Examples of suitable organic-inorganic hybrid coatings for use in barrier coatings include organic-inorganic hybrid coatings formed by sol-gel or other techniques. For example one or more the following may be included in a barrier coating: Kurarister; hydrolysate of tetraethyl orthosilicate; Oxaqua™ by Metalvuoto; aqueous dispersion of an exopolysaccharide called pullulan, MMT clay, and tetraethyl orthosilicate (TEOS) with acid added to catalyze the condensation of TEOS; PLA/Silica hybrid sol gel coatings; and unsaturated organosilanes and carboxylates subjected to e-beam treatment post-coating.

Examples of suitable inorganic coatings for use in barrier coatings include coatings comprising aluminum oxide or silicon oxide.

Examples of suitable organic vapor deposited coatings for use in barrier coatings include Freshure® sold by Knowfort Technologies and developed by by Royal DSM N.V. using Symphase® technology; Triazine-bearing molecules deposited under weak vacuum; polyamides; polyimide; polyamide-imide; polyhydrazide; polyamide-hydrazide; polyazomethine; and parylene poly-p-xylylene.

Hyperbranched hydroxyl-functional polyesters are examples of suitable polyester emulsions that may be included in a barrier coating.

Examples of suitable epoxies that may be included in a barrier coating include epoxy-amines such its Bairocade® from PPG and epoxy amines available from Dow Corning.

Examples of suitable polyhydroxyalkaonates (PHA) that may be included in a barrier coating include polyhydroxybutyrate (PHB), polyhydroxyvalerate (PHV), polyhydroxyhexanoate (PHH), and mixtures and copolymers thereof.

InMat Nanolok PT3575 (clay nanocomposite) is an example of a sulphopolyester that may be included in a barrier coating.

Mitsui (Takeda) TAKELAC XWNC-5 is an example of a polyurethane that may be included in a barrier coating.

SharkDispersionC5™ (clear grease barrier) is an example of a poly(vinyl butyral) that may be included in a barrier coating.

Examples of suitable proteins that may be included in a barrier coating include whey protein Wheylayer®, and zein.

Tykote®, 1004, 1005, and 1019 are examples of suitable anionic carboxylated styrene-butadiene copolymer latex.

In some embodiments a barrier coating may include layer-by-layer assembled coatings such as ionically bonded polyelectrolytes and/or inorganic platelets, crosslinked layer-by-layer coatings, and coatings applied by atomic layer deposition.

In some embodiments a barrier coating includes a polymer with a high aspect ratio filler such as a mineral (e.g., clay); metallic flakes, graphite, graphene, ZrP, and the like.

In some embodiments, the barrier coating may have dual functionality. For example, the barrier coating may also be an adhesive. Examples of adhesive harrier coatings include Morton (Dow); PASLIM developed by DIC corporation; and polyurethane adhesives.

In some embodiments, the barrier coating may also serve as a primer. For example, the barrier coating may comprise PVOH or suitable resins.

For purposes of this disclosure, a barrier coating is not a metallic layer. A metallic layer comprises metallic bonding in which electron density is delocalized and spread throughout the metallic structure. The nature of the metallic bonds accounts for many physical characteristics of metals, such as conduction of electricity, strength malleability, ductility and luster. Metallic layers are different from layers that comprise, compounds containing a metal, such as metal oxides or metal salts. Metallic bonding is distinct from covalent or ionic bonding. For example, ionic bonding may result from Coulombic attraction of positively and negatively charged species in which electrons are tightly held by the ions. Ionic solids tend to be hard and brittle and tend to not be malleable or ductile. In covalent bonds, electrons are tightly bound within well-defined bonds (relative to metallic bonds). Covalently hound materials tend to not conduct electricity. In some embodiments, a barrier coating comprises, consists essentially of, or consists of a metal oxide.

The barrier coating may be applied via a coating composition comprising one or more solvents or diluents suitable to dissolve, suspend or disperse the barrier materials. Preferably, the solvents or diluents are removable by evaporation leaving a layer comprising barrier material disposed on the first portion of the film that forms at least a portion of the first compartment. Upon drying or curing the layer comprising barrier material preferably adheres to the surface of the film on which the coating is applied.

The coating composition may comprise any suitable solvent or diluent. The solvent or diluent employed may vary depending on the barrier materials used.

The coaling composition may be applied using any suitable technique for patterned application of a coating. For example, the coating composition may be rolled, printed sprayed, or otherwise deposited on tie first portion of the film. Preferably, the coating composition is applied via a flexographic printing or rotogravure printing.

The coating may be applied to an outer surface of the film, an inner surface of the film, or to both an outer surface and an inner surface. The coating may be applied between two layers of the film. The coating may be disposed across the entire surface of the first portion of the film or may be disposed on only a portion of the first portion. The portion of the first portion that is coated with the barrier coating, the pattern of the coating, the thickness of the coating, and the like may be varied to tailor the barrier properties of the first portion of the film. In some embodiments, the resulting barrier coating layer has a thickness of 15 micrometers or less. Second and subsequent portions of the film may have different coating or no coating.

The choice of polymers and coating composition, application pattern and coating thickness may be tailored to achieve appropriate barrier properties, such as limiting permeation of oxygen, carbon dioxide, nitrogen, moisture, alcohol, aroma, and the like. Preferably, the coating provides oxygen barrier properties.

The coating may reduce the oxygen transmission rate across the first portion of the film relative to the second portion of the film by any suitable amount. In some embodiments, the ration of oxygen transmission rate of the second portion of the film (not coated with barrier coating) relative to the first portion (coated with barrier coating) is 5:1 or greater, such as 10:1 or greater, 250:1 or greater of 25.000:1 or greater.

Oxygen transmission rates across various portions of the film may be evaluated in any suitable manner. For example, oxygen transmission rate may be measured as described in ASTM D3985-05—Standard Test Method for Oxygen Gas Transmission Rate Through Plastic Film and Sheeting Using a Coulomelric Sensor (2010) or ASTM F1927-14Standard Test Method for Determination of Oxygen Gas Transmission Rate, Permeability and Permeance at Controlled Relative Humidity Through Barrier Materials Using a Coulomelric Detector (2014), as appropriate.

Moisture transmission rates may be measured in any suitable manner, such as described in ASTM FI249-13 Standard test Method for Water Vapor Transmission Rate Through Plastic Film and Sheeting Using a Modulated Infrared Sensor (2013).

Based on the design of the package of which the film is to be used, the coating composition may be applied to the first region that will form at least a portion of the first compartment of the multi-compartment package to reduce the oxygen transmission rate of the package in the first compartment relative to a second compartment, at least a portion of which is formed by a second portion of the film to which the barrier coating is not applied or is different.

The barrier coating may be applied to tie film that is sized for use in the package or is a larger web of film, such as a roll of film, which may be cut to form multiple films sized for use in package.

The application of the barrier coating may be registered with an edge of the roll of film, with graphic printed on the film, with impressions on the film or the like. The coating may be registered in the machine direction and in the transverse direction.

A large roll of film suitable for forming multiple films for use in packages may include impressions representing a portion of the roll that may be used to form a single package or portion of a package. The impressions may be repeated (stepped-out) in the machine direction and optionally in the transverse direction. Impressions on the roll may be defined by graphics printed on the film.

Preferably, the barrier coating is transparent. However, the barrier coating may be opaque in some embodiments.

Packages

A multi-compartment package having a first compartment isolated from a second compartment may be formed entirely or partially from a film as described herein.

If the package is formed entirely from the film, the film may be sealed to itself to form the first compartment and to form the second compartment. At least a portion of the film that forms the first compartment contains a barrier coating to reduce oxygen transmission rate to the first compartment relative to the second compartment.

Alternatively and preferably, the films are sealed to containers forming a portion of the first and second compartments. When a film is sealed to the container, a package containing isolated first and second compartments is formed. The film contains a barrier coating disposed on the portion of the film that forms a portion of the first compartment.

The films may be sealed to the container in any suitable manner. For example, the film may be adhesively sealed to the container, the film may be heat sealed to the container, the film may be cold sealed to the container, or the like. In some embodiments, the film is thermal bonded to the container or ultrasonically bonded to the container. In some embodiments, the films are packable and re-sealable to the container in a manner as described in, for example, U.S. Pat. No. 7,927,679, which in hereby incorporated herein by reference in its entirety to the extent that it does not conflict with the disclosure presented herein.

The first compartment may be flushed with gas or otherwise environmentally modified just prior to sealing the film to the container to generate a modified atmosphere package (MAP) within the first compartment.

The film may be sealed to any suitable container to form a package comprising first and second compartments having differing oxygen permeations. Preferably, the container to which the film is scaled has an oxygen transmission rate at least as low as the barrier-coated first portion of the film. More preferably, the container has an oxygen transmission rate that is lower than the barrier-coated first portion of the film. For example, the barrier-coated first portion of the film may have may have an oxygen transmission rate that is two times or more greater, such as five times or more greater or ten times or more greater, than the container.

The container to which the film is sealed may be formed of any suitable material. Preferably, the container is more rigid than the film. For example, the container may be rigid or semi-rigid. As used herein, "rigid" refers to a characteristic as stiff, unyielding, not apt to substantially give way under pressure without breaking, unable to substantially bend without breaking or unable to change shape without breaking. As used herein, "semi-rigid" refers to a characteristic of rigid to some degree or in some parts stiff and solid, but not inflexible. A semi-rigid material may be apt to give way under pressure without breaking, may be able to bend without breaking or may be able to change shape without breaking, but not to the same degree as a flexible material.

Examples of suitable materials for forming the container include polystyrene, high impact polystyrene, styrene-butadiene co-polymers and blends thereof, polypropylene homo and co-polymers, heterophasic polypropylene and blends, aromatic polyesters particularly poly(ethylene) terephthalate, aliphatic polyesters such as poly-lactic acid, cyclic olefin co-polymer, and high density polyethylene.

Packaged Products

Any suitable articles may be packaged in a multi-compartment package described herein. Preferably, a more oxygen-sensitive article is packaged in the first compartment having reduced oxygen transmission rates and a less oxygen-sensitive article is packaged in the second compartment a greater oxygen transmission rate than the first compartment.

In some embodiments, the articles packaged in the multi-compartment packages are food products. Any suitable food products may be packaged in the packages. In some embodiments, the food article packaged in the first compartment comprises: as protein article, such as meat, and the food article packaged in the second compartment comprises a vegetal article, such as produce.

In some embodiments, the articles packaged in the multi-compartment packages include a liquid, vapor or gas. For example, the food article packaged in the first compartment may be a cereal article which has volatile flavor components, and the food article in the second compartment may be dairy based, such as yogurt or milk?.

With the above general discussion in mind, reference in now made to the embodiments shown in the Figures.

Figure 1:
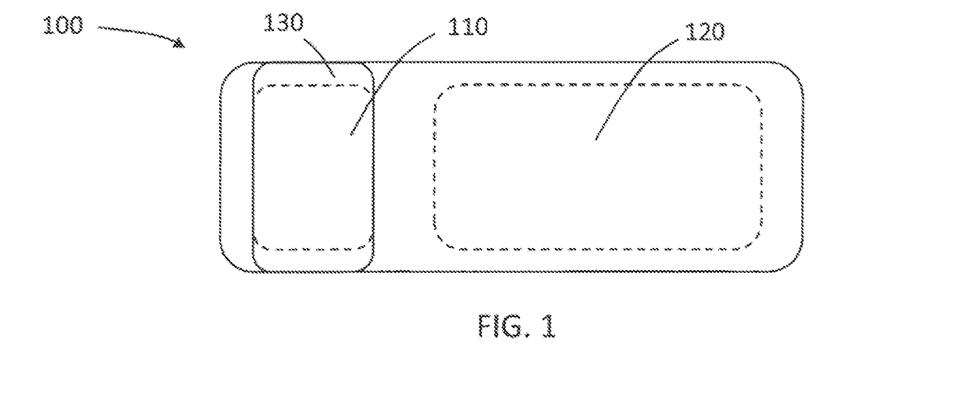
FIG. 1 is a schematic top view of a film according to embodiments described herein.

Referring to FIG. 1, an embodiment of a schematic top view of a film 100 sized for use in a package is shown. The film 100 includes a first portion 110 indicated by dashed lines and a second portion 120 indicated by dashed lines. The first portion 110 is configured to form a portion of a first compartment of a package when the film 100 is sealed to a suitable container. The second portion 120 is configured to form a portion of a second compartment of the package when the film 100 is sealed to the suitable container. The film 100 includes a barrier coating 130 disposed on the first portion 110 but not on the second portion 120. The film 100, including the barrier coating 130, is transparent.

Figure 2:
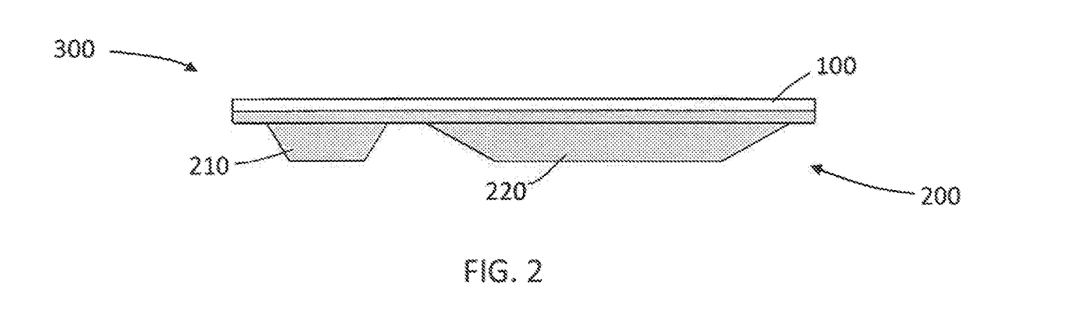
FIG. 2 is a schematic side view of a package according to embodiments described herein.

Referring now to FIG. 2, a schematic side view of a package 300 is shown. The package 300 includes a film 100, such as a film depicted in FIG. 1 is sealed to a container 200. The container 200 may be a tray as depicted. The container 200 forms a first portion 210 of a first compartment and a second portion 220 of a second compartment of the package 300. The First compartment of the package 300 is formed between the first portion 210 of the container 200 and the film 100. The second compartment of the package 300 is formed between the second portion 220 of the container 200 and the film 100.

Figure 3:
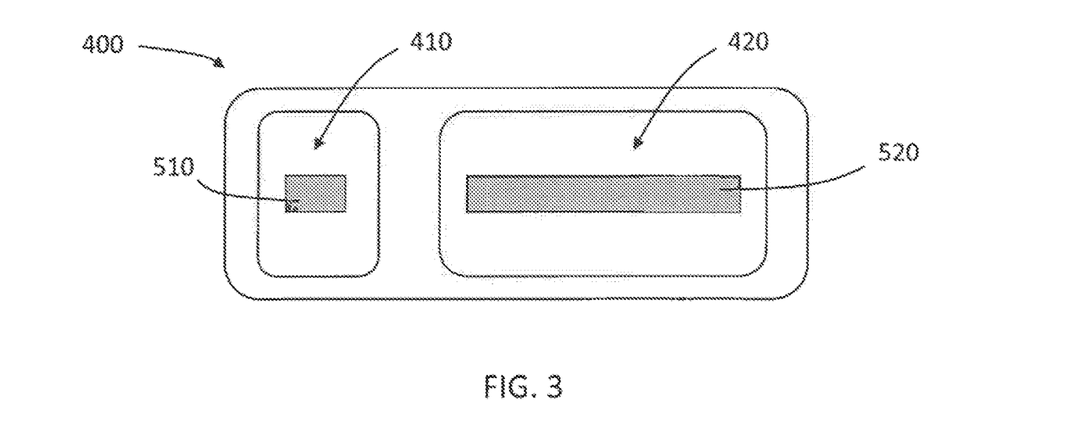
FIG. 3 is a schematic top view of a packaged product according to embodiments described herein.

Referring now to FIG. 3, a schematic top view of a packaged product 400 is depicted. The packaged product 400 includes a multi-compartment package, such as a package as depicted in FIG. 2, a first article 510, and a second article 520. The first article 510 is disposed in a first compartment 410 of a package, and the second article 520 is disposed in a second compartment 420 of the package. The film, such as film 100 depicted in FIG. 1 or FIG. 2, is transparent to allow visual inspection of the articles 510, 520 disposed in the package.

Figure 4A:
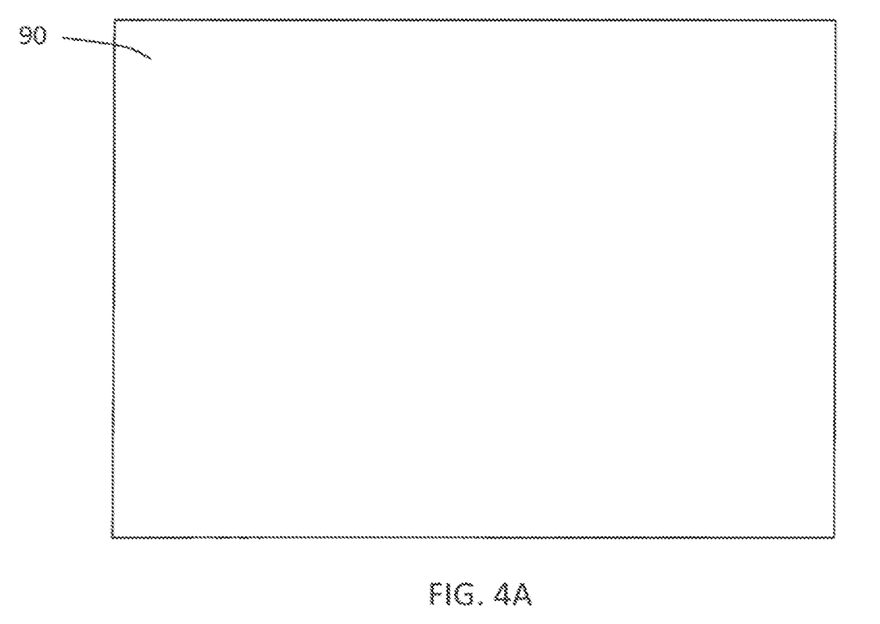
FIGS. 4A-C are schematic top views of large rolls of films illustrating a method to produce multiple films sized for use with packages according to embodiments described herein.
Figure 4B:
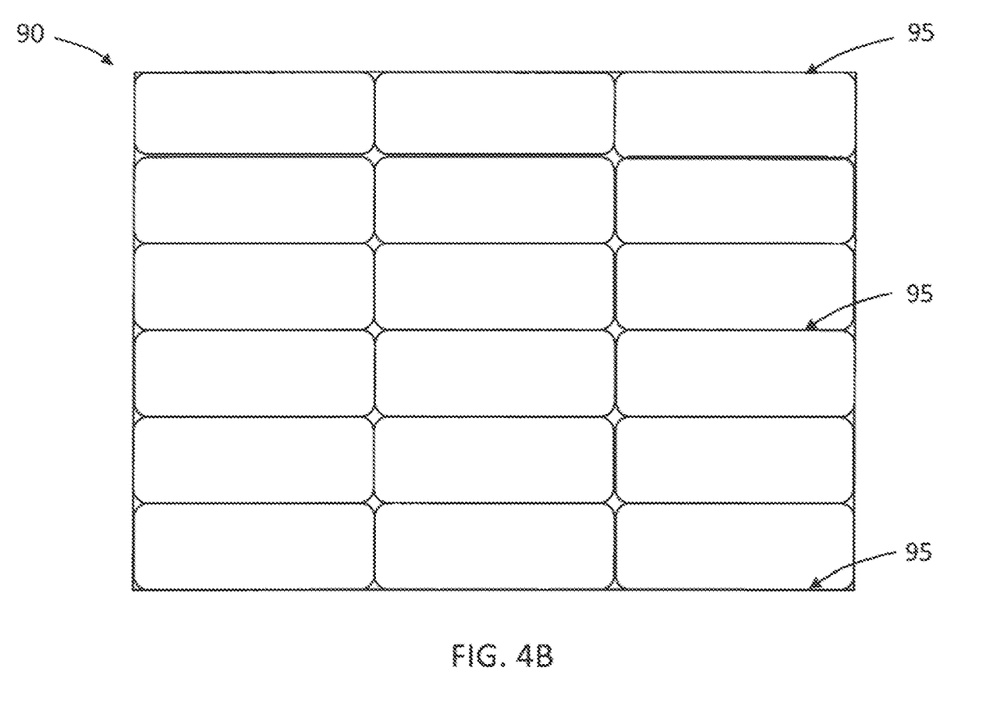
Figure 4C:
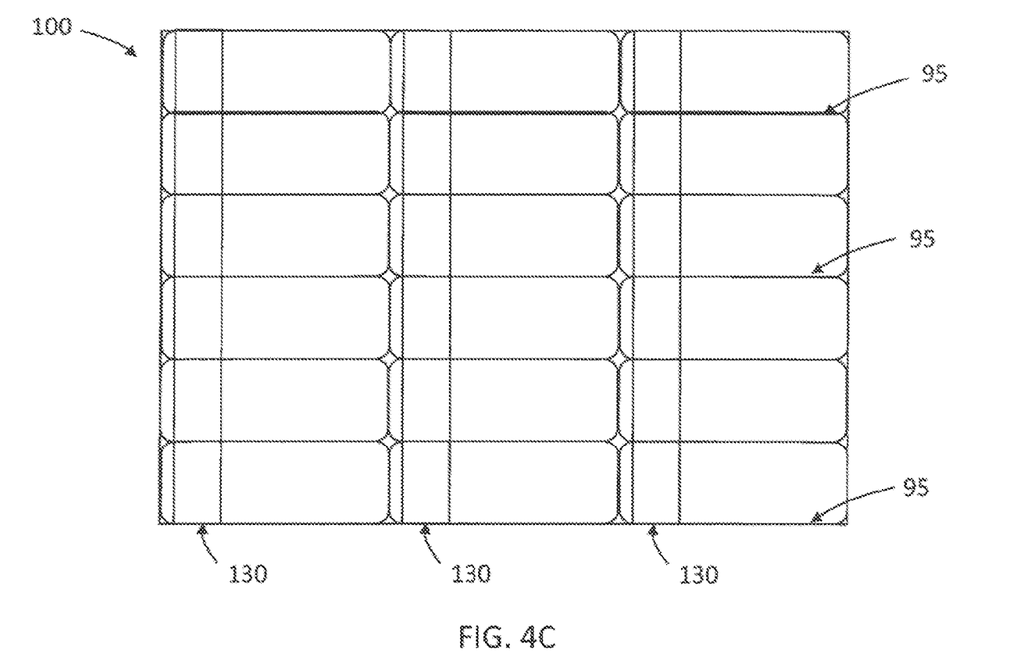

Referring now to FIGS. 4A-C, a process for forming a film that can be used to form multiple films sized for use with packages described herein, such as films 100 depicted in FIG. 1 or FIG. 2, is shown. In FIG. 4A a schematic view of a film 90 is shown. Film 90 may be, for example, a roll of film (shown unrolled). Film 90 is sufficiently large for a plurality of films, such as films 100 depicted in FIG. 1 or FIG. 2, sized for use with packages described herein.

As shown in FIG. 4B, a plurality of impressions 95 may be printed or otherwise demarked on film 90. Each impression defines an outline of a film, such as film 100 depicted in FIG. 1 or FIG. 2, sized for use with packages described herein. The impressions may be repeated or stepped-out in the machine direction.

Referring now to FIG. 4C, a barrier coating 130 may be coated on film 90 to create a film 100. The barrier coating 130 is applied on the film in an area of the impressions that will form the first portion (such as first portion 110 depicted in FIG. 1) of a film sized for use with packages as described herein. The films sized for use with packages as described herein may be punched out or cut out, using impressions 95 as a guide, from larger film 100 depicted in FIG. 4C.

Figure 5:
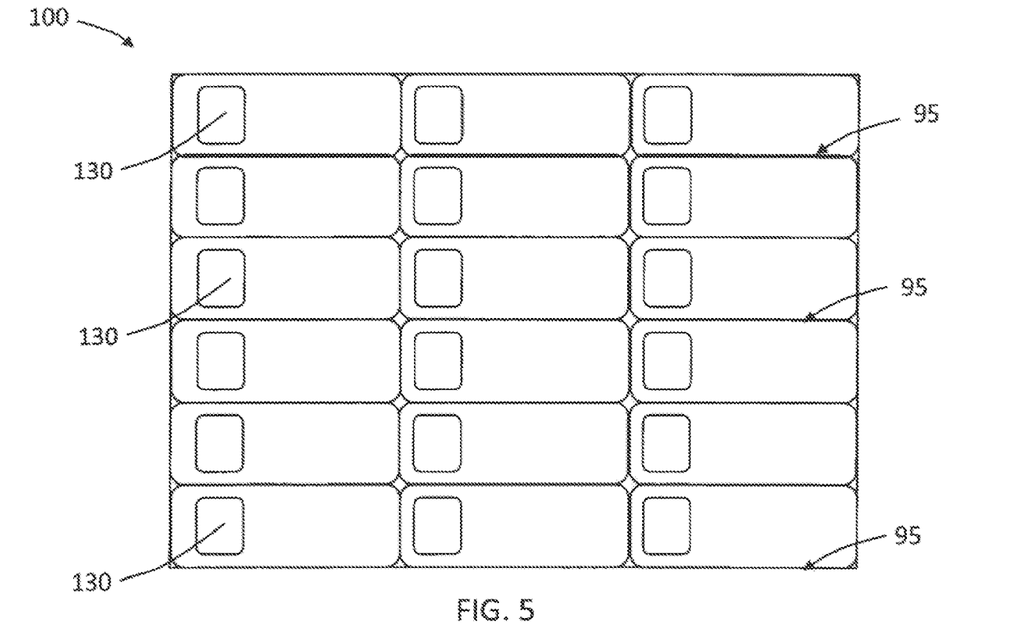
FIG. 5 is schematic top views of large roll of film that may be used to produce multiple films sized for use with packages according to embodiments described herein.

Referring now to FIG. 5, an alternative film 100, relative to film 100 depicted in FIG. 4C is shown. The barrier coating 130 is applied as islands on film 100 depicted FIG. 5 rather that a strip as depicted in FIG. 4C.

Figure 6:
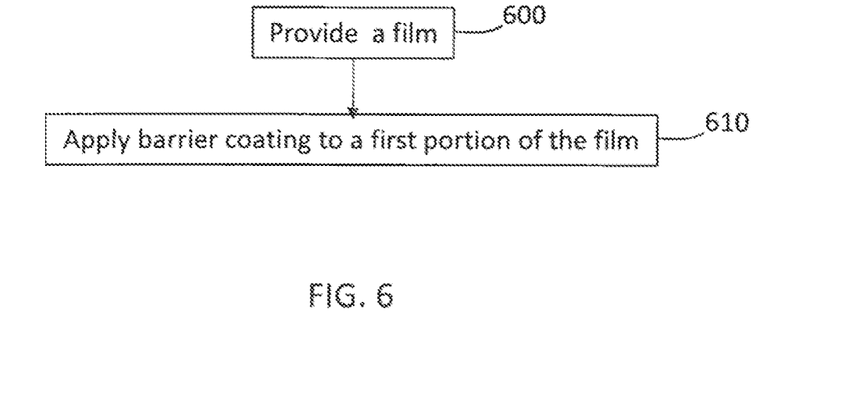
FIG. 6 is a flow diagram illustrating a method according to embodiments described herein.

Referring now to FIG. 6, a flow diagram of an embodiment of a method for forming a film for use in forming a multi-compartment package having a first compartment and a second compartment is shown. The method includes providing a film (600) and applying a barrier coating to a first portion of the film configured to form at least a portion of the first compartment (610). The barrier coating reduces the rate of permeation of a migratory species in the first region relative to a second region of the film configured to form at least a portion of the second compartment. The film may be a film 100 as depicted in FIG. 1 or a film 100 depicted in FIGS. 4A-C or 5. In some embodiments, the film comprises a plurality of impressions (e.g., impressions 95 depicted in FIG. 4B), each impression comprising a first region configured to form at least a portion of the first compartment and a second region of the film configured to form at least a portion of the second compartment.

As used herein, singular forms "a," "an" and "the" include plural referents unless the context clearly dictates otherwise. Thus, for example, reference to a "structured bottom surface" includes examples having two or more such "structured bottom surfaces" unless the context clearly indicates otherwise.

As used herein, the term "or" is generally employed in its sense including "and/or" unless the content clearly dictates otherwise. The term "and/or" means one or all of the listed elements or a combination of any two or more of the listed elements. The use of "and/or" in certain instances herein does not imply that the use of "or" in other instances does not mean "and/or".

As used herein, "have", "has", "having", "include", "includes", "including", "comprise", "comprises", "comprising" or the like are used in their open ended inclusive sense, and generally mean "include, but not limited to", "includes, but not limited to", or "including, but not limited to".

"Optional" or "optionally" means that tire subsequently described event, circumstance, or component, can or cannot occur, and that the description includes instances where the event, circumstance, or component, occurs and instances where it does not.

The words "preferred" and "preferably" refer to embodiments of the disclosure that may afford certain benefits, under certain circumstances. However, other embodiments may also be preferred, under the same or other circumstances, furthermore, the recitation of one or more preferred embodiments does not imply that other embodiments are not useful, and is not intended to exclude other embodiments from the scope of the inventive technology.

For purposes of the present disclosure, recitations of numerical ranges by endpoints include all numbers subsumed within that range (e.g., 1 to 5 includes 1, 1.5, 2, 2.75, 3, 3.80, 4, 5, etc.). Where a range of values is "greater than" "less than" etc. a particular value, that value is included within the range.

Any direction referred to herein, such as "top," "bottom," "left," "right," "upper," "lower," "above," "below," and other directions and orientations are described herein for clarity in reference to the figures and are not to be limiting of an actual device or system or use of the device or system. Many of the devices, articles or systems described herein may be used in a number of directions and orientations.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any oilier claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a barrier coating comprising a polyalchol include embodiments where a barrier coating consists of a polyalcohol and embodiments where a barrier consists essentially of a polyalcohol.

As used in the claims that follow, "providing" an article means making the article, purchasing the article, or otherwise obtaining the article.)

Thus, methods, systems, devices, compounds and compositions for PACKAGING AND PACKAGING FILM HAVING BARRIER PROPERTIES are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in film manufacturing or related fields are intended to be within the scope of the following claims.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

What is claimed is:

1. A packaged product comprising:
a first compartment;
a second compartment separated from the first compartment;
a first article in the first compartment;
a second article in the second compartment;
a film having a first portion and a second portion, wherein the first portion forms at least a portion of the first compartment and wherein the second portion forms at least a portion of the second compartment; and
a barrier coating applied in strips or islands;
wherein the first portion of the film comprises the barrier coating and the second portion of the film does not comprise the barrier coating or comprises less of the barrier coating than the first portion of the film, wherein the first portion of the film with the barrier coating has a permeation rate of a migratory species less than the second portion of the film without the barrier coating or with less of the barrier coating.

2. A packaged product according to claim 1, wherein the barrier coating is transparent.

3. A packaged product according to claim 1, wherein the film is transparent.

4. A packaged product according to claim 1, wherein the film is opaque.

5. A packaged product according to claim 1, wherein the barrier coating reduces permeation of one or more of oxygen, carbon dioxide, nitrogen, moisture, and aroma molecules.

6. A packaged product according to claim 1, further comprising a container having a first portion and a second portion, wherein the first portion of the container defines at least a part of the first compartment and wherein the second portion of the container defines at least a portion of the second compartment, wherein the film is sealed to the container such that the first compartment is formed between the first portion of the film and the first portion of the container and wherein the second compartment is formed between the second portion of the film and the second portion of the container.

7. A packaged product according to claim 6, wherein the film is heat sealed, ultrasonically sealed or adhesively sealed to the container.

8. A packaged product according to claim 6, wherein the film is peelable from the container.

9. A packaged product according to claim 6, wherein the container comprises a tray.

10. A packaged product according to claim 1, wherein the film is sealed to itself to form the package.

11. A packaged product according to claim 10, wherein the package is resealable.

12. A packaged product according to claim 1, wherein an external surface of the film comprises an oriented layer.

13. A packaged product according to claim 1, wherein the barrier coating comprises one or more of a polyacrylate, a polyalcohol, a polyvinylidene chloride, and an organic-inorganic hybrid.

14. A packaged product according to claim 1, wherein one or both of the first article and the second article are food articles.

* * * * *

UNITED STATES PATENT AND TRADEMARK OFFICE
CERTIFICATE OF CORRECTION

PATENT NO. : 11,814,229 B2
APPLICATION NO. : 16/496785
DATED : November 14, 2023
INVENTOR(S) : Ryan A. Michaud et al.

Page 1 of 4

It is certified that error appears in the above-identified patent and that said Letters Patent is hereby corrected as shown below:

On the Title Page

Item (72) (Inventors), Line 3 Delete "MI" and insert -- WI --, therefor.

In the Specification

Column 1, Line 27, Delete "On" and insert -- In --, therefor.

Column 1, Line 33-34, Before "This disclosure", insert title -- Brief Summary --, therefor.

Column 1, Line 35, Delete "ha" and insert -- having --, therefor.

Column 1, Line 41, After "compartment;" and insert -- a --, therefor.

Column 1, Line 45, Delete "compartments" and insert -- compartment, --, therefor.

Column 1, Line 49, Delete "harrier" and insert -- barrier --, therefor.

Column 1, Line 53, Delete "harrier" and insert -- barrier --, therefor.

Column 1, Line 57, Delete "learner" and insert -- barrier --, therefor.

Column 1, Line 60, After "both" and insert -- of --.

Column 1, Line 65, Delete "harrier" and insert -- barrier --, therefor.

Column 2, Line 2, Delete "harrier" and insert -- barrier --, therefor.

Column 2, Line 10, Delete "w herein" and insert -- wherein --, therefor.

Signed and Sealed this
Thirty-first Day of December, 2024

Derrick Brent
*Acting Director of the United States Patent and Trademark Office*

CERTIFICATE OF CORRECTION (continued)
U.S. Pat. No. 11,814,229 B2

Column 2, Line 14, Delete "scaled" and insert -- sealed --, therefor.

Column 2, Line 17, Delete "peealable" and insert -- peelable --, therefor.

Column 2, Line 19, Delete "scaled" and insert -- sealed --, therefor.

Column 2, Line 37, Delete "coaling" and insert -- coating --, therefor.

Column 2, Line 42, Delete "harrier" and insert -- barrier --, therefor.

Column 2, Line 53, Delete "harrier" and insert -- barrier --, therefor.

Column 2, Line 60, Delete "harrier" and insert -- barrier --, therefor.

Column 3, Line 14, Delete "harrier" and insert -- barrier --, therefor.

Column 3, Line 20, Delete "harrier" and insert -- barrier --, therefor.

Column 4, Line 34, Delete "firms" and insert -- forms --, therefor.

Column 4, Line 41, Delete "harrier" and insert -- barrier --, therefor.

Column 5, Line 6, Delete "fight" and insert -- light --, therefor.

Column 5, Line 8, Delete "vale" and insert -- value --, therefor.

Column 5, Line 33, Delete "scaling" and insert -- sealing --, therefor.

Column 5, Line 59, Delete "fiuidized" and insert -- fluidized --, therefor.

Column 6, Line 35-36, Delete "choice. Of materials" and insert -- choice of materials --, therefor.

Column 7, Line 30, Delete "styrene" and insert -- styrenic --, therefor.

Column 7, Line 33, Delete "VLDEPE" and insert -- VLDPE --, therefor.

Column 7, Line 50, Delete "coaling" and insert -- coating --, therefor.

Column 7, Line 67, Delete "coaling" and insert -- coating --, therefor.

Column 8, Line 40, Delete "Pilin" and insert -- film --, therefor.

Column 8, Line 42, Delete "(||)" and insert -- (μ) --, therefor.

Column 8, Line 46, Delete "(1.1" and insert -- 0.1 --, therefor.

CERTIFICATE OF CORRECTION (continued)
U.S. Pat. No. 11,814,229 B2

Column 8, Line 47, Delete "pack" and insert -- packaging films --, therefor.

Column 8, Line 54, Delete "east" and insert -- cast --, therefor.

Column 8, Line 60, Delete "thermo formed" and insert -- thermoformed --, therefor.

Column 8, Line 61, Delete "heal scaled" and insert -- heat sealed --, therefor.

Column 9, Line 4, Delete "polygycolic" and insert -- polyglycolic --, therefor.

Column 9, Line 5-6, Delete "polyhydroxyalkaonates" and insert -- polyhydroxyalkanoates --, therefor.

Column 9, Line 7-8, Delete "poly(vinyl pynrolidone" and insert -- , poly(vinyl pyrrolidone) --, therefor.

Column 9, Line 17, Delete "montmorillonite" and insert -- montmorillonite --, therefor.

Column 9, Line 22, Delete "tilled" and insert -- filled --, therefor.

Column 9, Line 31, Delete "Gohscei" and insert -- Gohsei --, therefor.

Column 9, Line 47, Delete "xylar" and insert -- xylan --, therefor.

Column 9, Line 58, Delete "coaling" and insert -- coating --, therefor.

Column 10, Line 17, After "by", delete "by".

Column 10, Line 26, Delete "its" and insert -- as --, therefor.

Column 10, Line 28, Delete "polyhydroxyalkaonates" and insert -- polyhydroxyalkanoates --, therefor.

Column 10, Line 54, Delete "harrier" and insert -- barrier --, therefor.

Column 11, Line 8, Delete "hound" and insert -- bound --, therefor.

Column 11, Line 23, Delete "coaling" and insert -- coating --, therefor.

Column 11, Line 26, Delete "tie" and insert -- the --, therefor.

Column 11, Line 51, Delete "ration" and insert -- ratio --, therefor.

Column 11, Line 61, Delete "Coulomelric" and insert -- Coulometric --, therefor.

Column 11, Line 64, Delete "Coulomelric" and insert -- Coulometric --, therefor.

CERTIFICATE OF CORRECTION (continued)
U.S. Pat. No. 11,814,229 B2

Column 11, Line 67, Delete "FI249" and insert -- F1249 --, therefor.

Column 12, Line 4, Delete "of" and insert -- for --, therefor.

Column 12, Line 12, Delete "tie" and insert -- the --, therefor.

Column 12, Line 52, Delete "packable" and insert -- peelable --, therefor.

Column 12, Line 64, Delete "scaled" and insert -- sealed --, therefor.

Column 13, Line 2, After "may have", delete "may have".

Column 13, Line 5, Delete "scaled" and insert -- sealed --, therefor.

Column 13, Line 38, Delete ": as" and insert -- a --, therefor.

Column 14, Line 39-40, Delete "FIG. 5 rather that a" and insert -- in FIG. 5 rather than a --, therefor.

Column 15, Line 10, Delete "tire" and insert -- the --, therefor.

Column 15, Line 45, Delete "oilier" and insert -- other --, therefor.

Column 15, Line 64, Delete "polyalchol" and insert -- polyalcohol --, therefor.